US005553716A

United States Patent [19]

Gearin et al.

[11] Patent Number: 5,553,716
[45] Date of Patent: *Sep. 10, 1996

[54] ADJUSTABLE VEHICLE-CARRYING FRAME

[75] Inventors: Peter Gearin, Portland; Everett A. Leech, Oregon City, both of Oreg.

[73] Assignee: G & G Intellectual Properties, Inc., Portland, Oreg.

[*] Notice: The term of this patent shall not extend beyond the expiration date of Pat. No. 4,797,049.

[21] Appl. No.: 520,747

[22] Filed: Aug. 28, 1995

Related U.S. Application Data

[63] Continuation of Ser. No. 433,629, May 3, 1995, Pat. No. 5,470,490, which is a continuation of Ser. No. 871,288, Apr. 20, 1992, Pat. No. 5,417,332, which is a continuation-in-part of Ser. No. 720,893, Jun. 25, 1991, Pat. No. 5,105,951, which is a continuation of Ser. No. 500,476, Mar. 28, 1990, Pat. No. 5,040,938, which is a continuation of Ser. No. 261,504, Oct. 24, 1988, Pat. No. 4,963,067, which is a continuation-in-part of Ser. No. 943,688, Dec. 18, 1986, Pat. No. 4,797,049.

[51] Int. Cl.$^6$ ........................................ A47F 7/00
[52] U.S. Cl. .................... 211/13; 211/175; 211/190; 414/400; 414/572; 414/786; 410/16; 410/18
[58] Field of Search ...................... 211/13, 175; 414/341, 414/343, 345, 352, 353, 389, 390, 395, 398–400, 495, 496, 498–500, 585, 679, 786, 542, 572; 410/3, 4, 13, 7–9, 16, 18, 30, 23–26, 29.1

[56] References Cited

U.S. PATENT DOCUMENTS

| | | |
|---|---|---|
| 362,453 | 5/1887 | Lozier . |
| 1,247,553 | 11/1917 | Linquist et al. . |
| 1,263,788 | 4/1918 | Michod . |
| 1,276,556 | 8/1918 | Michod . |
| 1,282,766 | 10/1918 | Daly . |
| 1,724,556 | 8/1929 | Blakely . |
| 1,869,054 | 7/1932 | Evans . |

(List continued on next page.)

FOREIGN PATENT DOCUMENTS

| | | |
|---|---|---|
| 164626 | 7/1953 | Australia . |
| 961699 | 1/1975 | Canada . |
| 468349A1 | 1/1992 | European Pat. Off. . |
| 1202387 | 1/1960 | France . |
| 1135782 | 8/1962 | Germany . |
| 46-15524 | 4/1971 | Japan . |
| 564584 | 1/1981 | Japan . |
| 5730310 | 7/1982 | Japan . |
| 61-115744 | 6/1986 | Japan . |
| 1006496 | 10/1965 | United Kingdom . |
| 2050304 | 1/1981 | United Kingdom . |
| WO81/01997 | 7/1981 | WIPO . |
| WO90/11911 | 10/1990 | WIPO . |

*Primary Examiner*—Robert W. Gibson, Jr.
*Attorney, Agent, or Firm*—Chernoff, Vilhauer, McClung & Stenzel

[57] ABSTRACT

An adjustable frame for carrying vehicles between elongate upright sides includes, on each side, a forward end and a rearward end, each end including an upper and lower rail section joined by elongate brace members, where the respective ends are separated from one another and a length-adjusting insert is carried between such ends to selectively permit adjustment of the position of the forward end relative to the rearward end while maintaining the ends in end-to-end alignment. On each side of the frame, preferably at least one of the upper rail sections has an end portion defining an open-ended hollow tube extending lengthwise of that side within which an elongate arm of the length-adjusting insert is slidably moveable so that structures on the outside surfaces of the rail sections will not interfere with length adjustment. Preferably, on each side, the upper and lower rail sections of the respective ends together define longitudinally aligned upper and lower pairs of open-ended tubes in which are slidably received an upper and lower pair of arms of the length-adjusting insert, thereby permitting the insert to remain permanently in position on each side regardless of the length selected. Preferably, also, the forward and rearward ends of the frame are lockable to the arms of the insert while keeping the insert centered longitudinally with respect to each side.

34 Claims, 7 Drawing Sheets

U.S. PATENT DOCUMENTS

| | | |
|---|---|---|
| 1,892,589 | 12/1932 | Snyder . |
| 1,978,287 | 10/1934 | Thomas . |
| 2,016,430 | 10/1935 | Hice . |
| 2,098,184 | 11/1937 | Fehr et al. . |
| 2,492,829 | 12/1949 | Baker . |
| 2,617,368 | 11/1952 | McCormick . |
| 2,838,338 | 6/1958 | Kerley et al. . |
| 3,043,454 | 7/1962 | Butler et al. . |
| 3,498,480 | 3/1970 | Gutridge . |
| 3,511,392 | 5/1970 | Blunden et al. . |
| 3,618,796 | 11/1971 | Peisner . |
| 3,650,416 | 3/1972 | Bodenheimer . |
| 3,667,635 | 6/1972 | Hackney . |
| 3,675,795 | 7/1972 | Dluhy . |
| 4,016,991 | 4/1977 | Oldford . |
| 4,124,119 | 11/1978 | Nordstrom . |
| 4,455,119 | 6/1984 | Smith . |
| 4,597,712 | 7/1986 | Smith . |
| 4,668,141 | 5/1987 | Petersen . |
| 4,668,142 | 5/1987 | Fity et al. . |
| 4,759,668 | 7/1988 | Larsen et al. . |
| 4,768,916 | 9/1988 | Gearin et al. . |
| 4,797,049 | 1/1989 | Gearin et al. . |
| 5,105,951 | 4/1992 | Gearin et al. . |
| 5,106,246 | 4/1992 | Chance . |
| 5,213,458 | 5/1993 | Preller et al. . |
| 5,253,975 | 10/1993 | Takaguchi . |
| 5,415,505 | 5/1995 | Halpin et al. . |
| 5,417,332 | 5/1995 | Gearin et al. .......................... 211/13 |
| 5,470,490 | 11/1995 | Gearin et al. .......................... 211/13 |

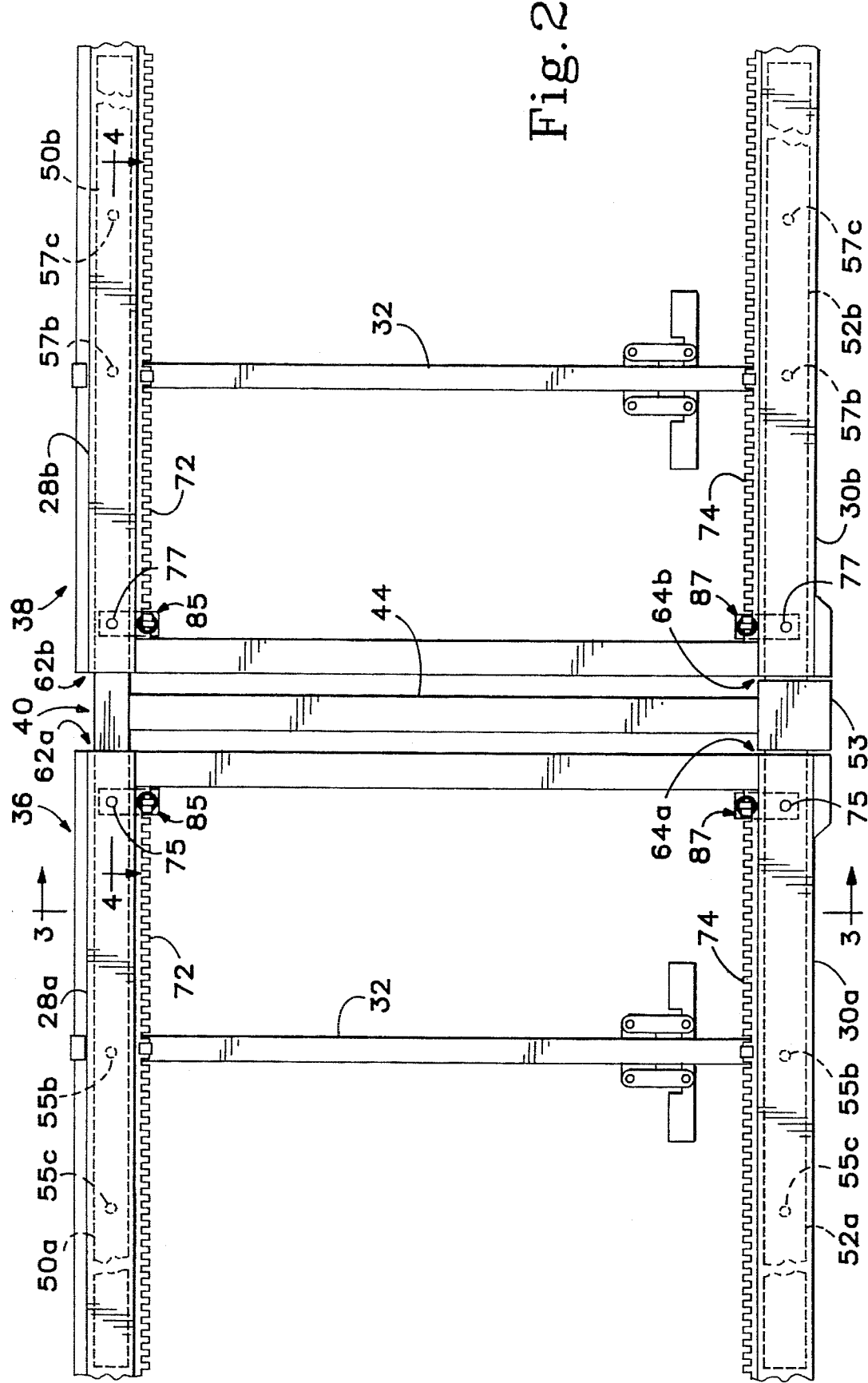

ADJUSTABLE VEHICLE-CARRYING FRAME

This application is a continuation of U.S. Patent application Ser. No. 08/433,629, filed May 3, 1995, now U.S. Pat. No. 5,470,490, which in turn is a continuation of U.S. Patent application Ser. No. 07/871,288, filed Apr. 20, 1992, now U.S. Pat. No. 5,417,332, which in turn is a continuation-in-part of U.S. Patent application Ser. No. 720,893, filed Jun. 25, 1991, now U.S. Pat. No. 5,105,951, which in turn is a continuation of U.S. Patent application Ser. No. 500,476, filed Mar. 28, 1990, now U.S. Pat. No. 5,040,938, which in turn is a continuation of U.S. Patent application Ser. No. 261,504 filed Oct. 24, 1988, now U.S. Pat. No. 4,963,067, which in turn is a continuation-in-part of U.S. Patent application Ser. No. 943,688, filed Dec. 18, 1986, now U.S. Pat. No. 4,797,049.

BACKGROUND OF THE INVENTION

The present invention relates to the adjustability of elongate frames of the type which have a generally open-sided construction making possible the loading of two or more tiers of vehicles onto the frame and which, after being loaded, are adapted for insertion into a standard cargo-carrying container for shipment.

Frames of the above type are shown, for example, in Gearin, et al. U.S. Pat. Nos. 4,768,916 and 4,797,049. A newer model of this type of frame is shown in Halpin, et al., U.S. Patent application Ser. No. 784,902, filed Oct. 30, 1991. In each of these disclosures, the frame shown is of a generally open-sided box-like construction where each side of the frame includes a longitudinally-extending upper and lower rail. Both at the corners of the frame and at longitudinally-spaced positions therebetween, upright brace members are used to connect together the upper and lower rail. At the ends of the frame, the sides are connected together such as by a spreader bar or by a two-panel centrally-hinged gate that is capable of being folded inwardly in order to collapse the sides of the frame.

In order to support vehicles on the above-described type of frame, respective pairs of elongate wheel cradles are suspended across the respective sides of the frame to support the forward and rearward wheels of each vehicle. In particular, each end of each wheel cradle is supported by an end hanger which, in turn, is vertically slidable and adjustably lockable along a tension member suspended by its upper end from the upper rail of the frame. The vertical slidability of the end hangers makes possible power-assisted vertical lifting of each vehicle by the hangers. The upper ends of the respective tension members are, in turn, longitudinally movable along the upper rails in order to compensate for differences in vehicle wheel base as well as to allow tilting of the vehicles. An elongate plate having numerous openings or slots spaced therealong is affixed to the inward edge of each upper rail, each opening or slot providing a different pinning or locking position for each tension member.

A difficulty with the above-described type of frame relates to the differing sizes of the containers that are encountered at different vehicle loading and unloading stations. In particular, cargo-carrying containers that are 40 feet, 45 feet, and 48 feet in length may be encountered. The present frames of fixed dimension are required to have a length no longer than that which will fit within the shortest container. This presents the problem of preventing to-and-fro movement of these frames within the longer-length containers during transport. Furthermore, even if a movement-limiting mechanism is provided, there remains the problem of the reduction in the number of vehicles that might otherwise have been shipped in the longer-length container. For example, whereas normally only three larger-sized vehicles can be carried on the present frame which is 39 feet in length (suitable for a 40-foot container) if, instead, the frame were 47 feet in length (suitable for a 48-foot container) it might be possible to carry as many as six larger-sized vehicles.

In view of the above, there clearly exists a need for a vehicle-carrying frame which is adjustable in length. Unfortunately, due to the basic structure of the frame as well as its intended use, this objective has not been readily obtainable. A frame having adjustable wheel platforms is shown in Swartzwelder U.K. Patent No. 1,006,496, but this reference does not describe how to achieve extensible movement between entire ends of the frame where each end includes upper and lower rails joined by elongate brace members. In fact, such extensibility is not easy to implement, particularly between the upper rails of each end, because these upper rails must uniformly provide numerous locking positions for the tension members which support the wheel cradle end hangers. Furthermore, because the side-to-side spacing of one end would differ somewhat from the side-to-side spacing of the other end in a telescoping structure, wheel cradles of different widths would be needed in order to support vehicles on the frame.

Accordingly, the principal object of the present invention is to provide a vehicle-carrying frame having an improved mechanism for adapting to containers of varying length by enabling selective adjustment of the length of the frame.

A related object of the present invention is to provide a mechanism of the above type that, despite such adjustability in length, retains the ability to position its vehicle-supporting tension members longitudinally wherever they are needed.

Another related object of the present invention is to provide a mechanism of the above type that does not require the use of wheel cradles having different widths in order to support vehicles at different positions on the frame.

Yet another related object of the present invention is to provide a mechanism of the above type where the length can be adjusted without the need to add or subtract any frame sections.

SUMMARY OF THE PRESENT INVENTION

To achieve the aforementioned objects, the present invention includes a length-adjusting insert carried permanently on each respective side of the frame. Each side is partitioned into two ends which each include an upper and lower extremity joined by elongate support members and which are separated longitudinally by the length-adjusting insert that adjusts the separation between the two ends.

In a preferred embodiment of the present invention, hollow upper rails on each end of the frame telescopically receive respective elongate arms of the length-adjusting insert. In this manner, the upper rails are free to shift along the length-adjusting insert to adjust the separation between the ends of the frame without interference with the adjustable positioning structure on the rails from which the vehicle-supporting tension members are suspended.

The foregoing and other objectives, features and advantages of the invention will be more readily understood upon consideration of the following detailed description of the invention, taken in conjunction with the accompanying drawings.

BRIEF DESCRIPTION OF THE DRAWINGS

FIG. 2 is a partial enlarged view of the adjustable frame of FIG. 1.

DETAILED DESCRIPTION OF THE INVENTION

Figure 1:
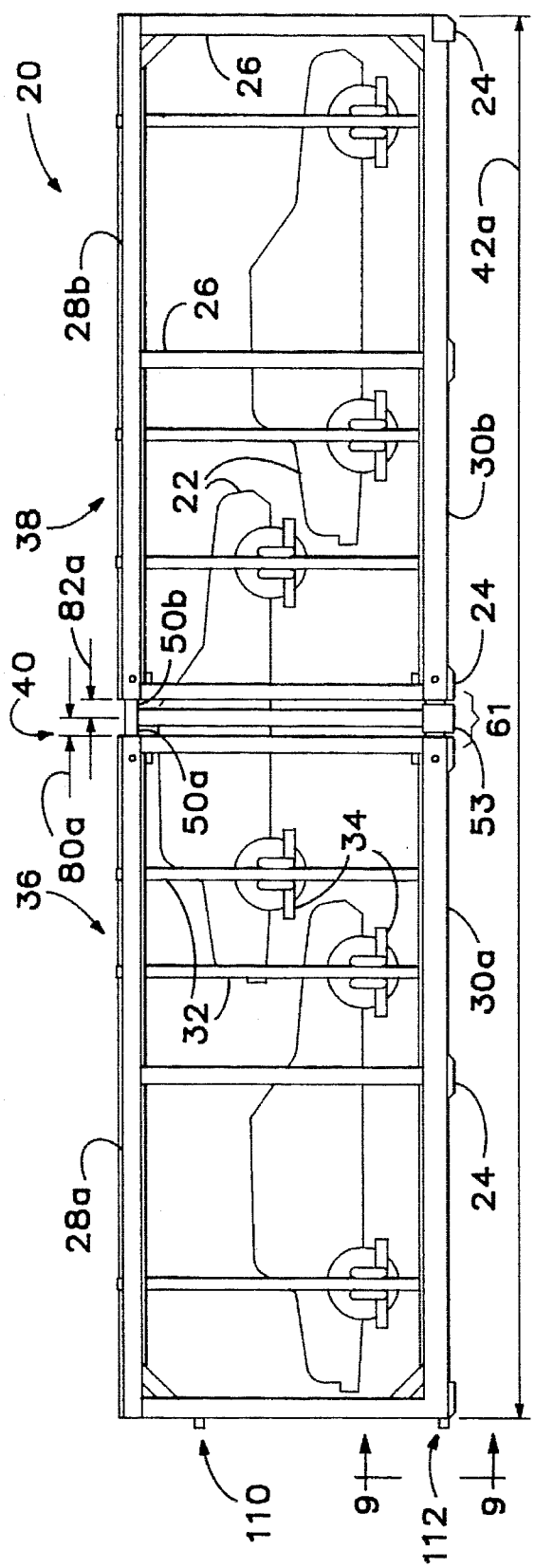
FIG. 1 is a side elevational view of an exemplary adjustable frame, in accordance with the present invention, showing the frame suitably adjusted for insertion into a shorter-length container.

FIG. 1 shows a side view of an exemplary embodiment of an adjustable frame 20 constructed in accordance with the present invention. As shown, a plurality of vehicles 22 can be loaded in two tiers on the frame. The frame includes spaced-apart sets of wheels 24 to facilitate movement of the frame into a standard cargo-carrying container after the frame has been loaded.

Figure 3:
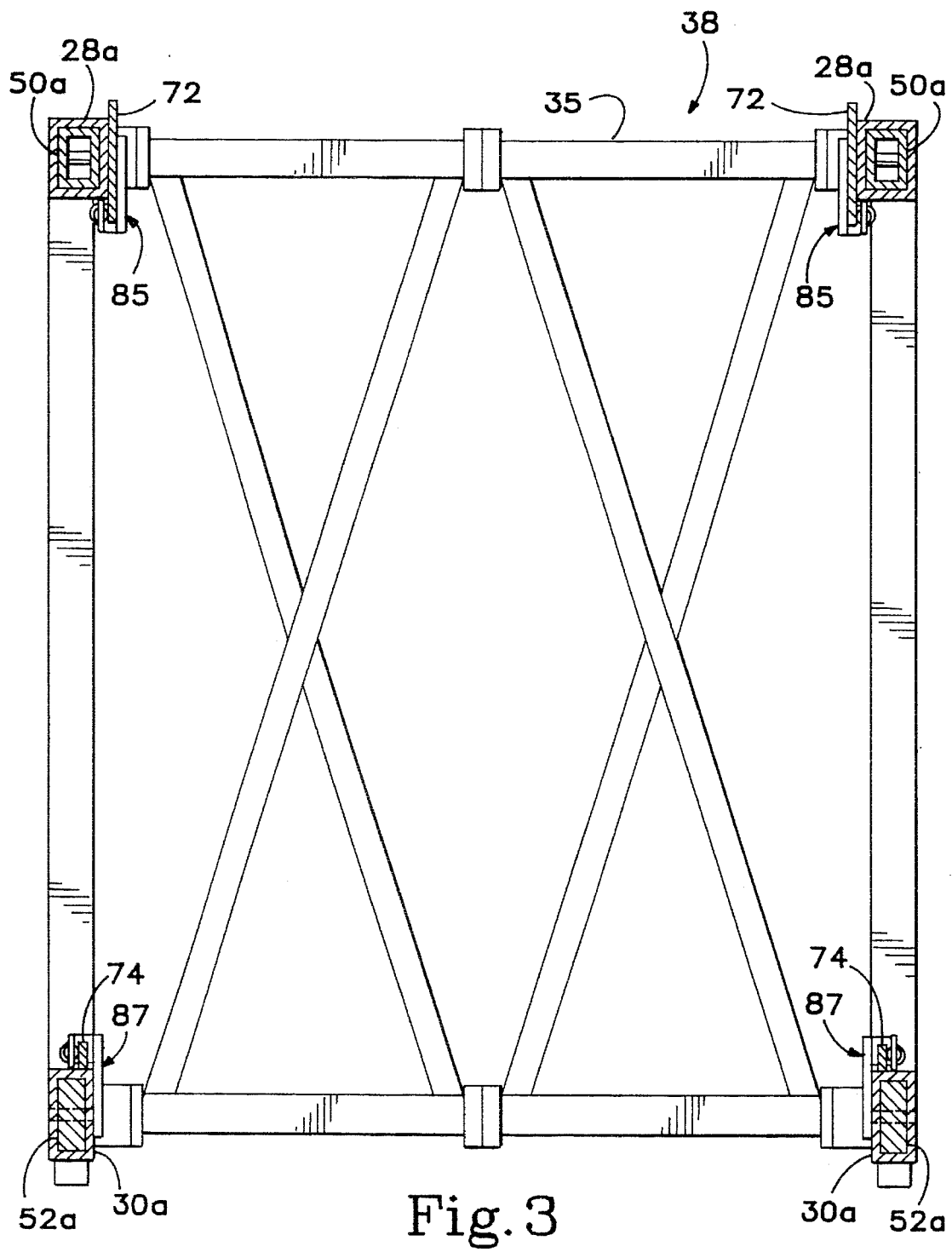
FIG. 3 is a sectional view taken along lines 3—3 in FIG. 2.

In several respects, the exemplary frame 20 is constructed in a manner similar to the construction of the frames which are described in U.S. Pat. No. 4,797,049, and U.S. Patent application Ser. No. 07/784,902, filed Oct. 30, 1991, which are herein incorporated by reference. In particular, on each side of the elongate frame 20, the frame includes a plurality of upright brace or compression members 26 each supporting a respective longitudinally extending upper rail section 28a–b above a longitudinally extending lower rail section 30a–b. As shown in FIG. 1, from the upper rail sections 28a–b on each side of the frame, a plurality of upright posts or tension members 32, which are movable longitudinally along the rail sections, are suspended vertically, and at least one end hanger 34 is releasably locked in a desired vertical position on each tension member 32 in order to carry a respective end of a wheel cradle (not shown) which extends across both sides of the frame. As was described in the Background section and, U.S. Pat. No. 4,797,049, each wheel cradle, in turn, supports either the forward or rearward pair of wheels of a particular vehicle 22. Referring also to FIG. 3, a two-panel centrally-hinged gate 35 located on the forward end 38 of the frame permits the respective sides of the frame to be brought to a closely-adjacent collapsed position after a spreader bar (not shown) at the rearward end 36 of the frame is first removed.

Figure 5:
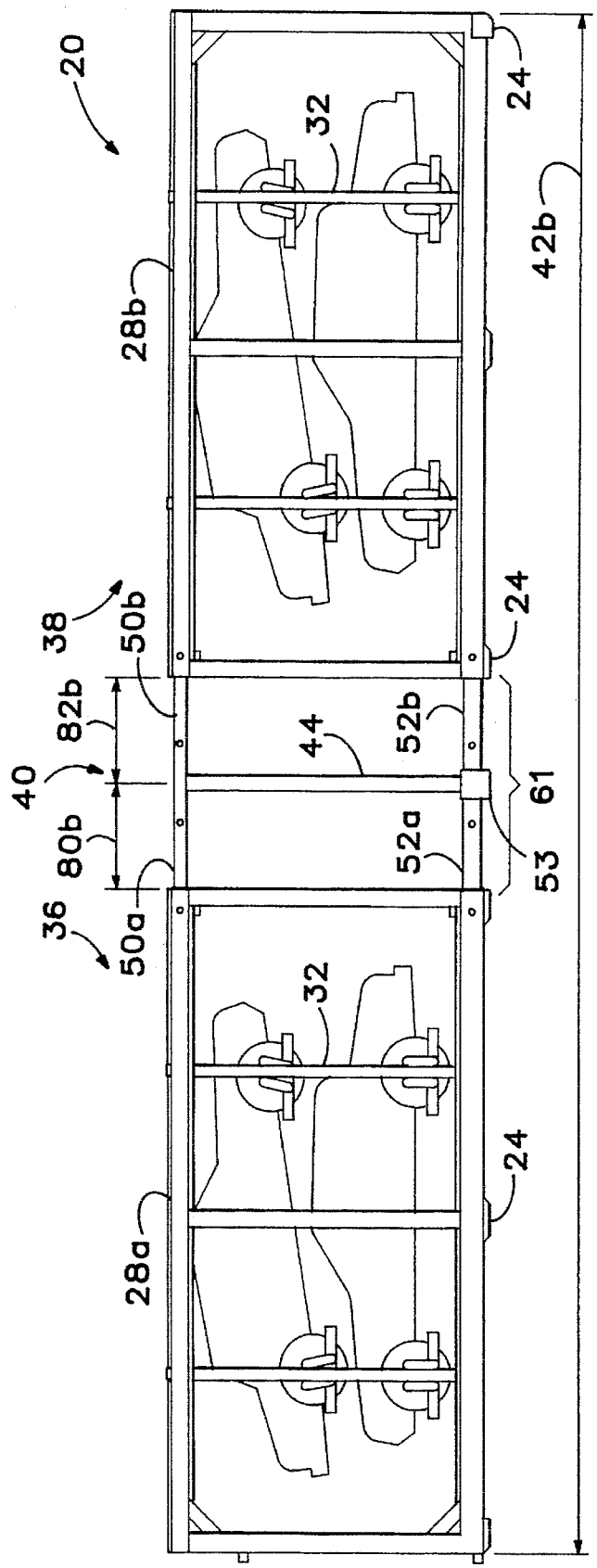
FIGS. 5-6 are side elevational views, similar to FIG. 1, but where the frame has been adjusted for insertion into a medium-length and longer-length container, respectively.
Figure 6:
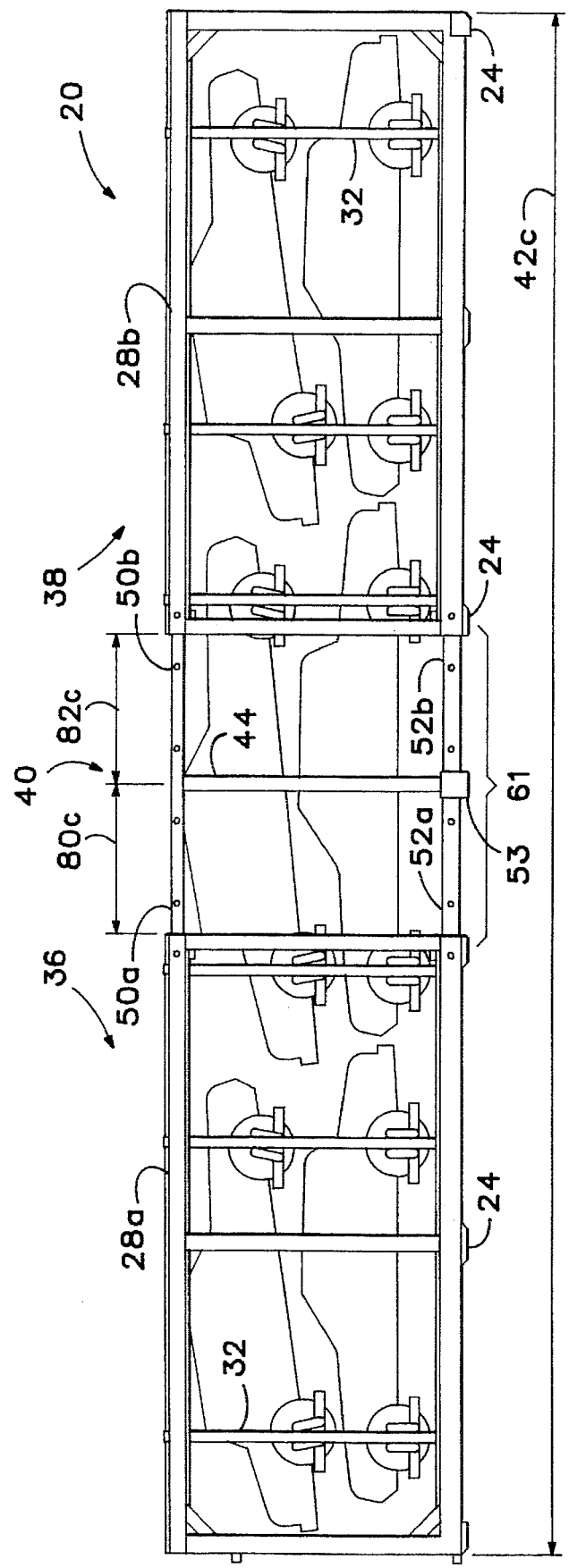

With respect now to the novel aspects of the frame, as shown in FIG. 1, on each side of the exemplary frame 20 both the upper and lower rails are partitioned into two longitudinally-separated sections. On each side, the rearward end 36 of the frame includes upper and lower rail sections which are respectively denoted by reference numerals 28a and 30a while the forward end 38 of the frame includes upper and lower rail sections which are respectively denoted by reference numerals 28b and 30b. Centrally carried on each side between the end 36 and the end 38 of the frame is a respective length-adjusting insert 40. Referring also to FIGS. 5 and 6, this length-adjusting insert enables the separation between the ends 36 and 38 to be adjusted so that the total length of the frame can be adjusted from a first length 42a of about 39 feet (FIG. 1) to a second length 42b of about 44 feet (FIG. 5) and then on to a third length 42c of about 47 feet (FIG. 6), for insertion into containers of 40, 45 and 48-foot lengths, respectively. The construction of the length-adjusting insert 40 and the mating surfaces of each end of the frame will now be described in detail.

Referring to FIG. 2, each length-adjusting insert 40 of the adjustable frame has a generally I-shaped construction. In particular, each insert includes an upright brace member 44 past the sides of which perpendicularly extend an upper pair of arms 50a and 50b, which are carried on the upper end of the brace member, and a lower pair of arms 52a and 52b which are carried on the lower end of the brace member. Referring also to FIG. 3, in the particular embodiment shown in the drawings, the upper pair of arms 50a and 50b are integrally formed on a single hollow-centered rail which is directly connected, as by welding, to the upper end of the brace member. The lower pair of arms 52a and 52b each comprise a solid rail and are connected, at their opposing ends, to a central wheel-box assembly 53 mounted on the lower end of the brace member.

In order to enable each insert 40 to be locked into adjustable positions on the frame, a plurality of longitudinally-spaced rearward and forward openings, respectively denoted by reference numerals 55a–c and 57a–c, are drilled through the lateral sides of each rearward and forward arm, respectively, of the insert. Viewing FIGS. 2 and 4 together, this is done so that respective ones of the rearward openings 55a, b, c, are located substantially the same lengthwise distance from the brace member 44 as corresponding ones of the forward openings 57a, b, c. The purpose underlying this arrangement will be made clearer below. The openings are further arranged, on the exemplary insert shown, so that the openings 55a–c and 57a–c on the upper arms 50a and 50b are vertically aligned with the correspondingly-numbered openings on the lower arms 52a and 52b.

With regard now to the ends 36 and 38 of the frame, as shown in FIG. 1, each respective side of the frame 20 is partitioned so that the ends are substantially matched in length. Accordingly, when the length adjusting insert 40 is installed, the insert is positioned substantially in the center of each respective side. This placement of the insert maximizes the number of vehicles 22 which can be loaded onto the frame. To clarify this further, because the respective tension members 32 are not suspendable from the upper pair of arms 50a–b of the exemplary insert now described, as they are from the upper rail sections 28a–b, the length-adjusting insert 40 defines a zone 61 along each side of the frame within which it is not possible to support the wheels of any vehicle. As shown in FIGS. 1, 5, and 6, having a wheel-free zone 61 in the center of each side, however, will not affect the normal three-vehicle, four-vehicle, or six-vehicle loading pattern. If, on the other hand, the wheel-free zone were positioned elsewhere, such as proximate an extreme end of the frame, the vehicles would need to be shifted longitudinally with respect to the foregoing loading patterns so that the number of vehicles that could be loaded on the frame would decrease.

Referring to FIG. 2, the respective upper rail sections 28a–b on one side of the frame together define a facing upper pair of open-ended hollow rectangular tubes 62a–b and, likewise, the respective lower rail sections 30a–b together define a facing lower pair of open-ended hollow tubes 64a–b. To install the length adjusting insert 40, the upper pair of arms 50a–b of the insert are slidably inserted into the upper pair of open-ended tubes 62a–b, while, at the same time, the lower pair of arms 52a–b of the insert are slidably inserted into the lower pair of open-ended tubes 64a–b.

Figure 4:
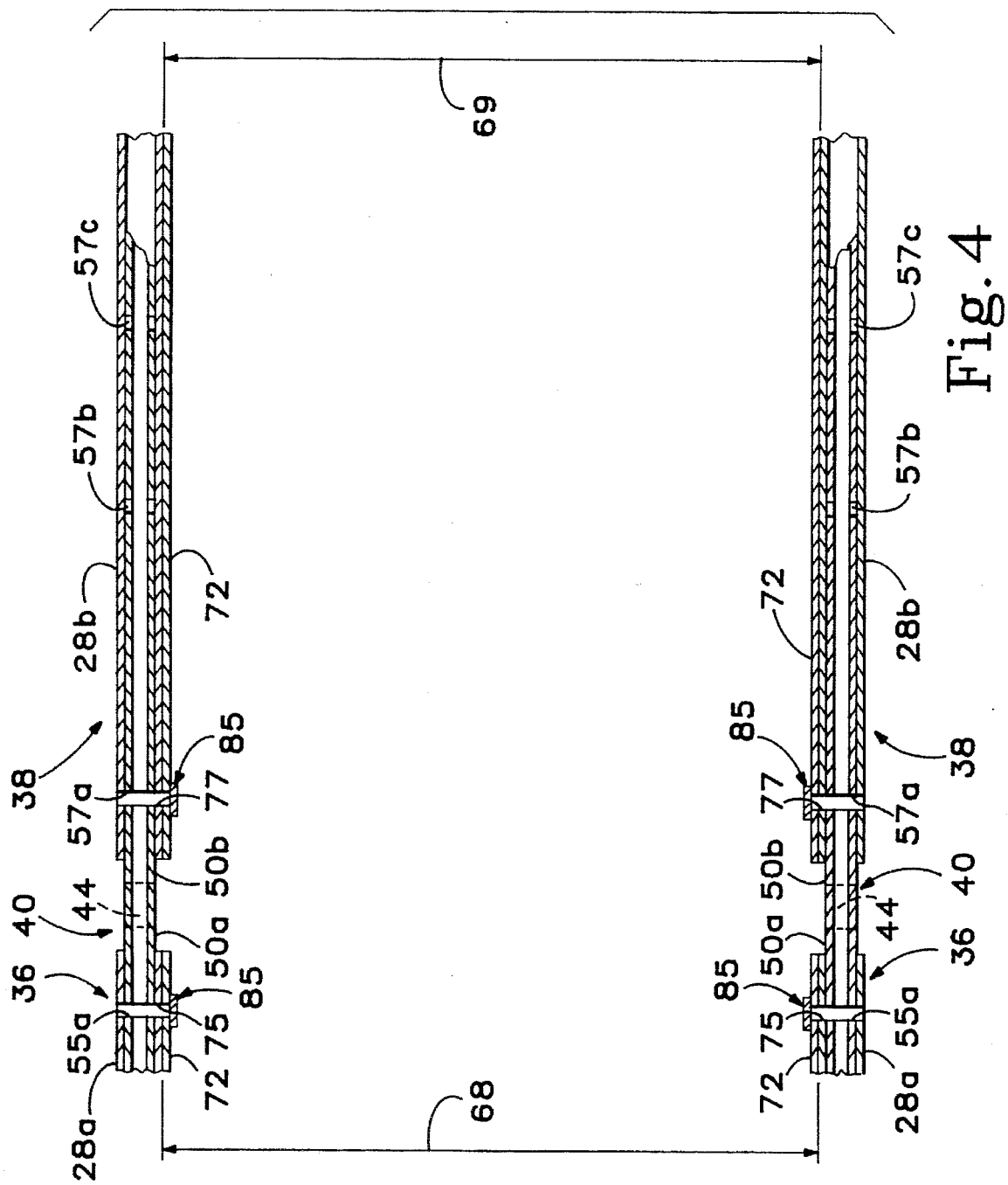
FIG. 4 is a sectional view taken along lines 4—4 in FIG. 2.

Referring now to FIG. 4, with the length-adjusting insert 40 slidably inserted into each end of the frame in this manner, the respective upper rail sections 28a of the rearward end 36 are maintained in end-to-end alignment with the corresponding upper rail sections 28b of the forward end 38. Similarly, the lower rail sections 30a of the rearward end are maintained in end-to-end alignment with the corresponding lower rail sections 30b of the forward end. These relationships, in turn, ensure that the side-to-side spacing 68 between respective rail sections of the rearward end will equal the side-to-side spacing 69 between respective rail sections of the forward end, so that wheel cradles of uniform side-to-side width can be used at either end.

Referring to FIGS. 2 and 4 together, the length-adjusting insert 40 enables relative movement between the respective ends 36 and 38 of the frame despite tension-member positioning structures on each end that overhang the upper and lower rail sections 28a–b and 30a–b. These include an upper and lower toothed plate 72 and 74, respectively. These two plates cooperate together to enable each tension member 32 to be shifted between and to be locked in, quickly and without mishap, a plurality of longitudinally-spaced positions along the frame. Referring also to FIG. 3, on each respective side, the upper toothed plate 72 is mounted on the inward side of each upper rail section 28a–b and overhangs each respective upper rail section, while the lower toothed plate 74 is mounted on the upper side of each lower rail section 30a–b. There is no interference between these respective plates and the length-adjusting insert because the respective pairs of arms 50a–b and 52a–b of the insert move entirely within, and not along the outside of, the respective rail sections 28a–b and 30a–b. Were it not for this arrangement, the aforedescribed wheel-free zone 61 on each respective side would generally be over twice the length that is shown in FIG. 1 and FIGS. 5–6 so that commensurately fewer vehicles could be carried on the frame.

Another advantage of the above-described interconnecting system is that the length-adjusting insert 40, once installed, can be maintained in ready-to-use position between the respective ends of each side of the frame. This is so whether, for example, the frame 20 needs to be adjusted to fit a relatively shorter-length container (FIG. 1) or whether, instead, the frame needs to be adjusted to fit a relatively longer-length container (FIG. 6). There is no need, in particular, when transporting the frame in a shorter-length container, to separately transport removable clamp-on attachments in order to be ready to fit the frame into longer-length containers, nor is there a need, whenever the switch to longer-length containers is being made, to lift and manipulate into place attachments of this sort.

The rearward and forward ends 36 and 38 of the frame are adapted to be pinned to the arms of each length-adjusting insert 40 to enable each insert to be locked into place so that the frame will maintain a constant length. In particular, referring to FIG. 2, on each side of the frame proximate the insert-receiving edge of the rearward end 36, a pair of vertically-aligned rearward holes 75 are drilled, the first between the lateral sides of the rearward upper rail section 28a and the upper toothed plate 72 and the second through the lateral sides of the rearward lower rail section 30a. Likewise, on each side of the frame proximate the insert-receiving edge of the forward end 38, a pair of vertically-aligned forward holes 77 are drilled, the first between the lateral sides of the forward upper rail section 28b and the upper toothed plate 72 and the second through the lateral sides of the forward lower rail section 30b. As depicted, the rearward holes 75 have substantially the same lengthwise offset from the insert-receiving edges of the rearward end 36 as the forward holes 77 have from the insert-receiving edges of the forward end 38.

Referring to FIG. 2, upon shifting the rearward end 36 away from the length-adjusting insert 40, respective ones of the plurality of vertically-aligned pairs of rearward openings 55a, b, c are successively brought into registration with the vertically-aligned pair of rearward holes 75. Viewing FIGS. 1 and FIGS. 5–6 together, each such position of registration defines a corresponding rearward locking position 80a, b, c. Similarly, upon shifting the forward end 38 away from the length-adjusting insert 40, respective ones of the plurality of vertically-aligned pairs of forward openings 57a, b, c are successively brought into registration with the vertically-aligned pair of forward holes 77. Viewing FIG. 1 and FIGS. 5–6 together, each such position of registration defines a corresponding forward-locking position 82a, b, c.

As a result of the arrangements heretofore described of the rearward openings 55a, b, c, relative to the forward openings 57a, b, c and of the rearward holes 75 relative to the forward holes 77, respective ones of the rearward locking positions 80a, b, c are located substantially the same lengthwise distance from the brace member 44 as corresponding ones of the forward locking positions 82a, b, c. This allows the brace member to be locked into a position which is substantially centered longitudinally of each side of the frame regardless of which length adjustment has been selected. Accordingly, when vehicles 22 have been loaded on the frame, the compressive forces which act on each brace member 26 and on each brace member 44 will be evenly distributed between these members.

Figure 8:
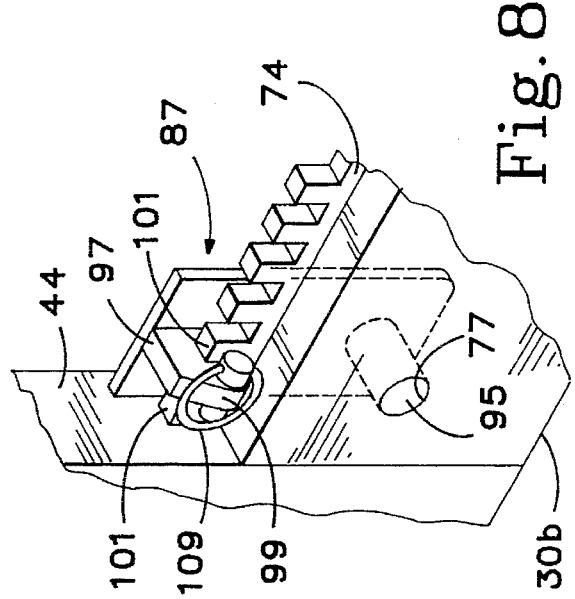
FIGS. 7-8 are perspective views of a lower pinning assembly which is shown apart from and in its intended use on the frame, respectively.
Figure 7:
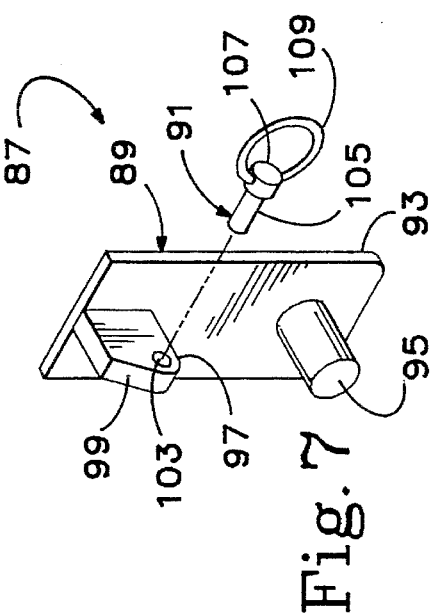

Referring to FIGS. 3 and 4, after the rearward and forward ends have been moved to a particular rearward and forward locking position, respectively, on each side of the frame, each end is pinned to the arms of the insert by upper and lower locking assemblies 85 and 87. Referring now to FIG. 7, each lower locking assembly 87 includes a main pinning member 89 and a separate self-locking pin 91. The main pinning member 89 includes a generally rectangular backing plate 93 from one side of which outwardly extends a generally cylindrical main pin 95 and a lug 97 of generally parallelipiped form except that the outermost edge 99 of the lug converges toward the rectangular plate at about a 30° slant in a direction moving away from the main pin. Referring to FIGS. 2 and 8, the main pin 95 is suitably dimensioned for close-fitting insertion between, for example, the forward hole 77 formed on the lower rail section 30b of the forward end 38 and a respective one of the forward openings 57a, b, c formed on the lower arm 52b of the insert 40, where the particular forward opening that is used will depend on which of the forward locking Positions 82a (FIG. 1), 82b (FIG. 5), or 82c (FIG. 6) has been selected. In similar manner, every other rail-section of each end of the frame is pinned to the corresponding arm of a respective insert.

Referring to the particular pinning position depicted in FIG. 8, lengthwise forces can act between the main pin 95 and the forward hole 77 which, unless protected against, can cause lengthwise wearing or elongation of the hole 77 which can, in turn, ultimately cause an excessive degree of play to develop between the insert and the forward end. To counteract this effect, the lug 97 is dimensioned and arranged on the plate 93, as shown, so that when the main pin is received in the hole 77, the lug is positioned for close-fitting insertion between a respective pair of the teeth 101 on the toothed plate 74. The teeth are preferably formed in the toothed plate using a burning torch, so that a hardened layer is developed along the edge of each tooth. Accordingly, the forces which might otherwise wear against the relatively softer drilled surfaces of the hole 77 are not able to wear against the relatively harder slotted surfaces of the toothed plate, and the main pin is held in nonvibratory position within the hole. The rearward or forward openings 55a–c and 57a–c on each lower arm 52a–b of the insert are also subject to such forces but are less susceptible to wearing than the holes 75 and 77 because the lower arms, being solid rails, have a greater length of material along the sides of their openings to resolve these forces.

Referring to FIGS. 7 and 8, in order that the main pin 95 and lug 97 do not back out of their respective pinning positions, the self-locking pin 91 is inserted through a hole 103 which is formed on the outer-most corner of the lug between the teeth-facing sides of the lug. This self-locking pin includes an elongate pin body 105, a head 107, and a ring 109 pivotably connected to the head by offset ends of the ring so that the ring is normally biased to a position immediately adjoining one side or the other of the pin body. Accordingly, after the self-locking pin is forced through the hole 103 on the lug, and after the ring has been swiveled, as shown in FIG. 8, in locked position over a corner of the lug (as facilitated by the slant of the outermost edge 99), the natural bias on the ring maintains this locked position. Concerning the upper locking assemblies 85 (FIG. 3), these locking assemblies are generally similar in construction to the lower locking assemblies 87 which have now been described, except for dimensional differences made necessary because of the different arrangements of the upper and lower toothed plates 72 and 74 and because the greater lateral thicknesses of the upper rail and arm members in comparison to the lower members.

Although not shown, each length-adjusting insert 40 can be optionally fitted with a pivotable set of tension member positioning plates in order to enable mounting of tension members in the wheel-free zone 61 when the frame is extended to its full length 42c as indicated in FIG. 6. Here each plate of the four-plate set comprises a shortened length of toothed plate, generally shaped like the plates 72 and 74 which are shown in FIG. 2. Each shortened plate is mounted, at one end, adjacent a respective end corner of the central brace member 44 for pivoting movement between a collapsed position adjacent and generally parallel to the brace member and a ready position adjacent and generally parallel to a corresponding one of the arms 50a, 50b, 52a, and 52b of the insert. A set of four pins are separately provided to releasably fasten the other end of each shortened plate to the corresponding arm of the insert in order to secure the plate in its ready position along that arm after the frame has been extended to its full length 42c as shown in FIG. 6. Tension members 32 can then be mounted on each plate along the corresponding arm of the insert in consistent manner with the procedure by which they are mounted to the plates 72 and 74 along each end of the frame. Alternatively, in order to make room along the arms of the insert for adjusting the frame to a shorter length, the pins are removed and each shortened plate is pivoted downwardly away from its corresponding arm to its collapsed position adjacent the brace member.

Figure 9:
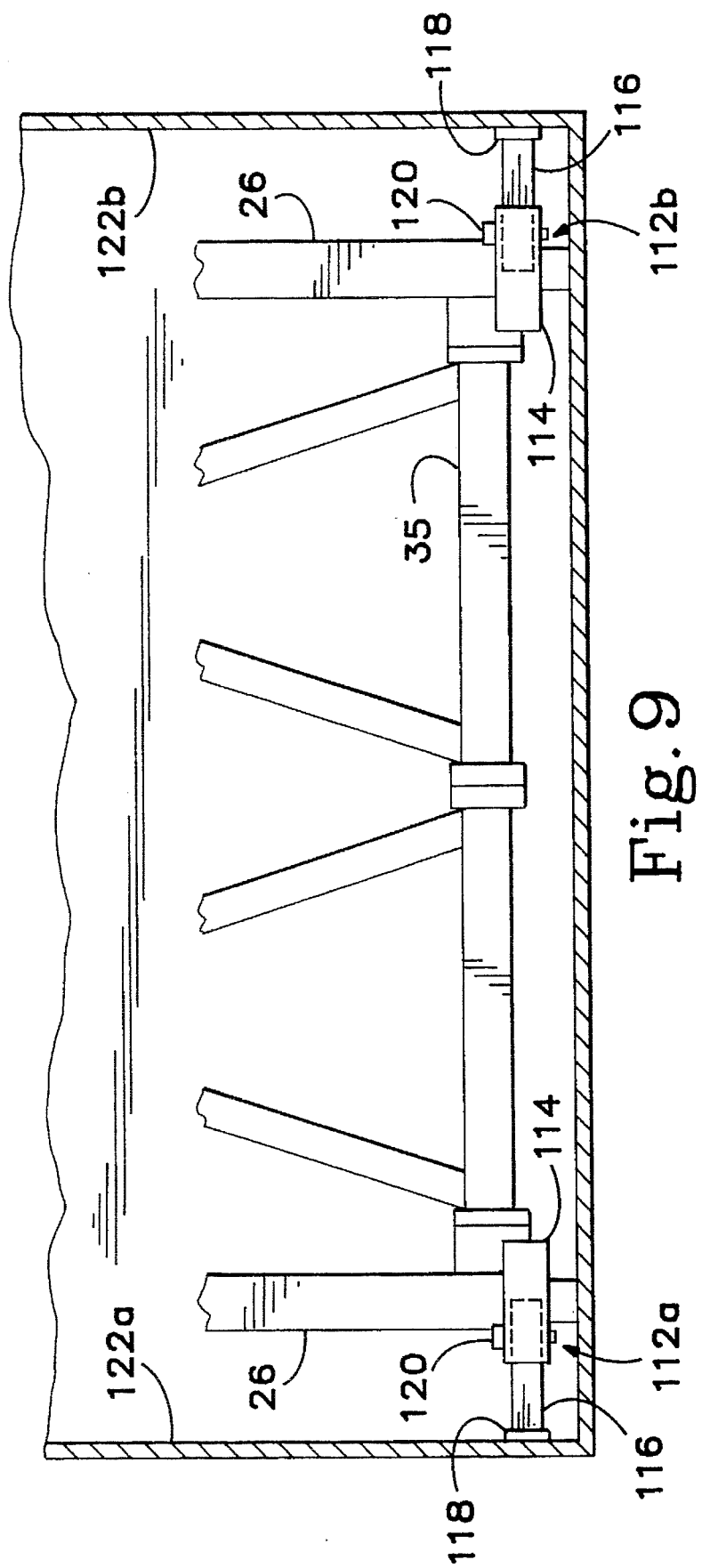
FIG. 9 is an expanded elevational view taken along lines 9—9 in FIG. 1, showing lower lateral spacer assemblies of the frame of FIG. 1 in their intended use after the frame has been loaded into a standard cargo-carrying container which is also shown.

Referring to FIG. 1 the adjustable frame 20 includes upper and lower lateral spacer assemblies 110 and 112 which are used to limit lateral movement of the frame inside a container into which the frame has been loaded for shipment. The frame may either be loaded by itself in its fully expanded condition or with other frames of like type where the sides of each frame have been collapsed into closely adjacent position in order, for example, that the return shipment of a large number of unloaded frames can be made. Referring also to FIG. 9, which shows the lower lateral spacer assemblies in a selected operative position for a single loaded frame, each left and right-hand spacer assembly (e.g., 112a and 112b) includes an elongate first hollow tube 114 of rectangular cross-section which is mounted in lateral extension from a respective corner brace member 26 on the rearward end 36 of the frame. Inside of each first hollow tube 114, fitted for telescopic extension therefrom, is a second hollow tube 116 on the end of which is affixed a plate 118 or other type of head. Holes (not shown) are drilled in the upper sides of the first and second tubes so that a pin 120 can be used to variously set the lengthwise extension of the combined spacer assembly.

As shown in FIG. 9, in their extended positions, the left and right-hand spacer assemblies 112a and 112b oppose or limit movement of the frame in either lateral direction toward the left or right sidewall 122a or 122b, respectively, of the container. Alternatively, where a number of frames have been loaded in collapsed condition inside a container, the left-hand spacer of the collapsed frame which is nearest to the left sidewall of the container and the right-hand spacer of the collapsed frame which is nearest to the right sidewall of the container can both be extended in order to achieve the movement-limiting effect.

While, in accordance with the present invention, a preferred embodiment of the adjustable frame 20 has b&en described, it will be recognized that certain modifications of the frame are possible without departing from the broader principles of the present invention. For example, whether the plurality of longitudinally-spaced locking holes are formed in the respective arms of the insert as shown, or whether they are formed, instead, in the respective rail sections, makes little difference in terms of being able to provide a plurality of forward and rearward locking positions. Clearly, also, the respective arm-supporting members and the respective arms of the insert can be constructed and connected together in a variety of ways, and it is even possible, with some loss in functionality, to dispense entirely with particular elements of the exemplary insert, such as the brace member or the wheels. Also, if desired, the brace member 44, and/or inward brace members 26 which are closest to the brace member 44, could be constructed similarly to the tension members 32 so as to be capable of mounting hangers 34 if needed for certain applications, even though they are not movable longitudinally along the rails as are the tension members 32.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A system for loading and transporting wheeled vehicles comprising:

(a) an elongate three-dimensional cargo-carrying enclosure having a closable opening;

(b) an elongate three-dimensional frame having transversely-spaced longitudinally-oriented upright sides and having respective transversely elongate front and rear vehicle wheel support members capable of supporting at least a first vehicle upon said frame in an elevated condition and vehicle wheel support members capable of supporting a second vehicle upon said frame at a level below said first vehicle, said frame being matingly insertable into said enclosure through said opening while said first and second vehicles are supported upon said frame by said wheel support members; and (c) at least one of said front and rear vehicle wheel support members being adjustable vertically with respect to the other so as to position at least one of the front and rear ends of said first vehicle at variable elevations relative to the other end.

2. A system for loading and transporting wheeled vehicles comprising:

(a) an elongate three-dimensional cargo-carrying enclosure having a closable opening;

(b) an elongate three-dimensional frame having transversely-spaced longitudinally-oriented upright sides and having vehicle wheel support members capable of supporting at least a first vehicle upon said frame in an elevated condition and a second vehicle upon said frame at a level below said first vehicle, said frame being matingly insertable into said enclosure through said opening while said first and second vehicles are supported upon said frame by said wheel support members; and (c) at least one of said wheel support members being adjustable longitudinally with respect to another of said wheel support members so as to vary the longitudinal distance therebetween.

3. A system for loading and transporting wheeled vehicles comprising:

(a) an elongate three-dimensional cargo-carrying enclosure having a closable opening;

(b) an elongate three-dimensional frame having transversely-spaced longitudinally-oriented upright sides and having respective transversely elongate front and rear vehicle wheel support members capable of supporting at least a first vehicle upon said frame in an elevated condition and vehicle wheel support members capable of supporting a second vehicle upon said frame at a level below said first vehicle, said frame being matingly insertable into said enclosure through said opening while said first and second vehicles are supported upon said frame by said wheel support members; and (c) at least said front and rear vehicle wheel support members interconnecting said pair of upright sides transversely.

4. A system for loading and transporting wheeled vehicles comprising:

(a) an elongate three-dimensional cargo-carrying enclosure having a closable opening;

(b) an elongate three-dimensional frame having transversely-spaced longitudinally-oriented upright sides and having vehicle wheel support members capable of supporting at least a first vehicle upon said frame in an elevated condition and a second vehicle upon said frame at a level below said first vehicle, said frame being matingly insertable into said enclosure through said opening while said first and second vehicles are supported upon said frame by said wheel support members; and (c) at least one of said vehicle wheel support members being movable vertically relative to said upright sides while supporting said first vehicle.

5. A system for loading and transporting wheeled vehicles comprising:

(a) an elongate three-dimensional cargo-carrying enclosure having a closable opening;

(b) an elongate three-dimensional frame having transversely-spaced longitudinally-oriented upright sides and having vehicle wheel support members capable of supporting at least a first vehicle upon said frame in an elevated condition and a second vehicle upon said frame at a level below said first vehicle, said frame being matingly insertable into said enclosure through said opening while said first and second vehicles are supported upon said frame by said wheel support members; and (c) said transversely-spaced upright sides including longitudinally-extending members for resisting longitudinal movement of any other vehicles in said enclosure relative to said first and second vehicles.

6. A system for loading and transporting wheeled vehicles comprising:

(a) an elongate three-dimensional cargo-carrying enclosure;

(b) an elongate three-dimensional frame having transversely-spaced longitudinally-oriented upright sides and having vehicle wheel support members for supporting at least a first vehicle upon said frame in an elevated condition, said frame being removably supported in said enclosure;

(c) at least one of said vehicle wheel support members being adjustable longitudinally with respect to another of said vehicle wheel support members so as to vary the longitudinal distance therebetween;

(d) said upright sides being longitudinally adjustable in length at locations longitudinally between respective ones of said vehicle wheel support members;

(e) at least one of said vehicle wheel support members being movable vertically relative to at least one of said upright sides while supporting said first vehicle.

7. The system of claim 6 wherein said vehicle wheel support members interconnect said pair of upright sides transversely.

8. The system of claim 6 wherein at least one of said vehicle wheel support members is adjustable vertically with respect to another of said vehicle wheel support members.

9. A system for loading and transporting wheeled vehicles comprising:

(a) an elongate three-dimensional cargo-carrying enclosure;

(b) an elongate three-dimensional frame having transversely-spaced longitudinally-oriented upright sides and having vehicle wheel support members for supporting at least a first vehicle upon said frame in an elevated condition, said frame being removably supported in said enclosure;

(c) at least one of said vehicle wheel support members being adjustable longitudinally with respect to another of said vehicle wheel support members so as to vary the longitudinal distance therebetween;

(d) at least one of said vehicle wheel support members being movable vertically relative to at least one of said upright sides while supporting said first vehicle.

10. The system of claim 9 wherein said vehicle wheel support members interconnect said pair of upright sides transversely.

11. The system of claim 9 wherein at least one of said vehicle wheel support members is adjustable vertically with respect to another of said vehicle wheel support members.

12. A system for loading and transporting wheeled vehicles comprising:
   (a) an elongate three-dimensional frame having transversely-spaced longitudinally-oriented upright sides, said upright sides including longitudinally-separated respective elongate upright members;
   (b) vehicle wheel support members supported by said upright members;
   (c) at least one of said vehicle wheel support members being movable vertically relative to at least one of said upright members while supporting a vehicle;
   (d) at least one of said upright members being adjustably positionable in different locations longitudinally with respect to another of said upright members.

13. The system of claim 12 wherein at least one of said vehicle wheel support members is movable vertically with respect to another of said vehicle wheel support members.

14. The system of claim 12 wherein transversely-spaced respective pairs of said upright members are interconnected transversely by a respective one of said vehicle wheel support members.

15. The system of claim 12 wherein each of said upright sides includes at least one longitudinally-extending elongate member which is longitudinally adjustable in length in at least one location longitudinally between said respective pairs of said upright members.

16. The system of claim 12 including at least first, second, third and fourth respective pairs of said upright members located longitudinally in series, said upright sides interconnecting at least said second and third respective pairs longitudinally so as to resist longitudinal movement therebetween.

17. The system of claim 16 wherein each of said upright sides includes at least one longitudinally-extending elongate member which is longitudinally adjustable in length in at least one location longitudinally between said second and third respective pairs.

18. The system of claim 12 wherein said frame is removably supported within an elongate three-dimensional cargo-carrying enclosure.

19. A system for loading and transporting wheeled vehicles comprising:
   (a) an elongate three-dimensional frame having transversely-spaced longitudinally-oriented upright sides, said upright sides including at least first, second, third and fourth respective pairs of transversely-spaced elongate upright members located longitudinally in series;
   (b) vehicle wheel support members transversely interconnecting a respective pair of said upright members;
   (c) at least one of said pairs of said upright members being adjustably positionable in different locations longitudinally with respect to another of said pairs;
   (d) said upright sides interconnecting at least said second and third pairs of transversely-spaced elongate upright members longitudinally so as to resist longitudinal movement therebetween.

20. The system of claim 19 wherein each of said upright sides includes at least one longitudinally-extending elongate member which is longitudinally adjustable in length in at least one location longitudinally between two of said respective pairs of transversely-spaced elongate upright members.

21. The system of claim 20 wherein said one location is longitudinally between said second and third respective pairs of transversely-spaced elongate upright members.

22. The system of claim 19 wherein at least one of said vehicle wheel support members is movable vertically relative to said upright sides while supporting a vehicle.

23. The system of claim 19 wherein at least one of said vehicle wheel support members is movable vertically with respect to another of said vehicle wheel support members.

24. The system of claim 19 wherein said frame is removably supported within an elongate three-dimensional cargo-carrying enclosure.

25. A system for loading and transporting wheeled vehicles comprising:
   (a) an elongate three-dimensional frame having transversely-spaced longitudinally-oriented elongate upright sides;
   (b) vehicle wheel support members supported by said upright sides;
   (c) at least one of said vehicle wheel support members being adjustably positionable in different locations longitudinally with respect to another of said vehicle wheel support members so as to vary the longitudinal distance between said vehicle wheel support members;
   (d) each of said upright sides being longitudinally adjustable in length independently of the positioning of at least one of said vehicle wheel support members in said different locations.

26. The system of claim 25 wherein at least one of said vehicle wheel support members is movable vertically relative to at least one of said upright sides while supporting a vehicle.

27. The system of claim 25 wherein at least one of said vehicle wheel support members is movable vertically with respect to at least one of said upright sides and movable vertically with respect to another of said vehicle wheel support members.

28. The system of claim 25 wherein each of said vehicle wheel support members transversely interconnects said upright sides.

29. The system of claim 25 wherein said frame is removably supported within an elongate three-dimensional cargo-carrying enclosure.

30. A system for loading and transporting wheeled vehicles comprising:
   (a) an elongate three-dimensional frame having transversely-spaced longitudinally-oriented upright sides, said upright sides including longitudinally-separated respective pairs of transversely-spaced elongate upright members;
   (b) respective vehicle wheel support members each being elongate in a direction transverse to said upright sides and transversely interconnecting a respective one of said pairs of transversely-spaced elongate upright members;
   (c) at least one of said vehicle wheel support members being movable vertically relative to said upright members and movable vertically relative to another of said vehicle wheel support members while supporting a vehicle;
   (d) at least one of said vehicle wheel support members being adjustably positionable in different locations longitudinally of said upright sides so as to vary the longitudinal distance between said vehicle wheel support members.

31. The system of claim 30 wherein each of said upright sides includes at least one longitudinally-extending elongate member which is longitudinally adjustable in length in at least one location longitudinally between said vehicle wheel support members.

32. The system of claim 30 including at least first, second, third and fourth wheel support members located longitudinally in series, said upright sides interconnecting at least said second and third wheel support members longitudinally so as to resist longitudinal movement therebetween.

33. The system of claim 32 wherein each of said upright sides includes at least one longitudinally-extending elongate member which is longitudinally adjustable in length in at least one location longitudinally between said second and third wheel support members.

34. The system of claim 30 wherein said frame is removably supported within an elongate three-dimensional cargo-carrying enclosure.

* * * * *